United States Patent
He et al.

(10) Patent No.: US 9,077,926 B2
(45) Date of Patent: Jul. 7, 2015

(54) IMAGE PROCESSING METHOD AND IMAGE PROCESSING APPARATUS

(75) Inventors: Yuan He, Beijing (CN); Jun Sun, Beijing (CN); Hao Yu, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 526 days.

(21) Appl. No.: 13/490,841

(22) Filed: Jun. 7, 2012

(65) Prior Publication Data

US 2012/0321198 A1      Dec. 20, 2012

(30) Foreign Application Priority Data

Jun. 15, 2011    (CN) .......................... 2011 1 0159928

(51) Int. Cl.
   *G06K 9/48*     (2006.01)
   *H04N 1/387*    (2006.01)

(52) U.S. Cl.
   CPC ..................................... *H04N 1/387* (2013.01)

(58) Field of Classification Search
   None
   See application file for complete search history.

(56) References Cited

U.S. PATENT DOCUMENTS

| | | | | |
|---|---|---|---|---|
| 5,940,544 A | * | 8/1999 | Nako | 382/293 |
| 6,011,635 A | * | 1/2000 | Bungo et al. | 358/488 |
| 6,124,950 A | | 9/2000 | Honda | |
| 6,256,411 B1 | * | 7/2001 | Iida | 382/203 |
| 7,072,527 B1 | * | 7/2006 | Nako | 382/290 |
| 2003/0156201 A1 | | 8/2003 | Zhang | |
| 2005/0078879 A1 | | 4/2005 | Sakurai et al. | |
| 2005/0163396 A1 | | 7/2005 | Morichika et al. | |
| 2007/0206877 A1 | * | 9/2007 | Wu et al. | 382/275 |
| 2008/0075392 A1 | | 3/2008 | Suzuki et al. | |
| 2009/0109502 A1 | | 4/2009 | Minamino | |
| 2010/0135595 A1 | | 6/2010 | Du et al. | |
| 2010/0253789 A1 | | 10/2010 | Hayasaki | |

FOREIGN PATENT DOCUMENTS

| | | |
|---|---|---|
| CN | 1471055 | 1/2004 |
| CN | 1645241 | 7/2005 |
| CN | 101155238 | 4/2008 |
| CN | 101460937 | 6/2009 |
| EP | 2490434 | 8/2012 |
| JP | 11-4323 | 1/1999 |
| JP | 2004-228759 | 8/2004 |
| JP | 4013060 | 11/2007 |
| JP | 2011-9813 | 1/2011 |

OTHER PUBLICATIONS

Korean Office Action issued Jul. 30, 2013 in corresponding Korean Application No. 10-2012-0056147.

(Continued)

*Primary Examiner* — Jayesh A Patel
(74) *Attorney, Agent, or Firm* — Staas & Halsey LLP

(57) ABSTRACT

An image processing method includes estimating corners of a contour of an object area in an obtained image, searching for contour lines of the object area between every two points which are offset from the estimated corners within a predetermined degree or distance along a direction away from the object area respectively, and determining intersection points of the contour lines as final corners of the contour of the object area, and determining contour lines between the final corners as a final contour of the object area.

14 Claims, 16 Drawing Sheets

(56) References Cited

OTHER PUBLICATIONS

Chinese Office Action issued Jul. 3, 2014 in corresponding Chinese Patent Application No. 201110159928.0.
Extended European Search Report issued Oct. 8, 2012 in corresponding European Patent Application No. 12168623.2.
Nobuyuki Otsu, "A Threshold Selection Method from Gray-Level Histograms", IEEE Transactions on Systems, Man and Cybernetics, vol. SMC-9, No. 1, Jan. 1979, pp. 62-66.
J.F. Wang et al., "Automated Road Network Extraction from Landsat TM Imagery", ASPRS-ACSM Annual Convention, vol. 1, 1987, pp. 429-438.

* cited by examiner

IMAGE PROCESSING METHOD AND IMAGE PROCESSING APPARATUS

This application claims priority to Chinese Patent Application No. 201110159928.0, filed on Jun. 15, 2011 and entitled "Image Processing Method and Image Processing Apparatus", contents of which are incorporated herein by reference in its entirety.

FIELD

The present embodiments relate to the field of image processing and, more particularly, to a method and an apparatus for determining a contour of an object area in an image, and a method and an apparatus for correcting the image based on the contour.

BACKGROUND

It is commonly necessary to utilize an imaging apparatus in order to input paper file information into a computer. The imaging apparatus is, for example, a traditional scanning imaging apparatus, such as a flatbed scanner, a drum scanner and so on. When the traditional scanning imaging apparatus is used, since the paper file (i.e. scanning object) is fixed on a scanning plane flatly and individual corners of the paper file (i.e. scanning object) are fixed and determinate with respect to an image sensor of the traditional scanning imaging apparatus, there is substantially no distortion and deformation in the image obtained by the traditional scanning imaging apparatus. Furthermore, with the development in the technology, there appears some curved surface imaging apparatuses such as a digital camera and a overhead scanner. When the curved surface imaging apparatus is used, for example when the digital camera or the overhead scanner is used to image, in an inclined angle, an opened thick book such as a dictionary, an encyclopedia, a manual or the like, there appears perspective transformation distortion and deformation resulting from perspective transformation in the obtained image due to imaging the opened thick book from above in the inclined angle. Moreover, since the paper face of the opened thick book may curve, there may also appear distortions and deformations such as stretch, compression or the like in the obtained image. Therefore, when the curved surface imaging apparatus is used, it is necessary to correct the obtained distortion and deformation image so as to generate a image without distortions and deformations.

To correct the distortion and deformation image, there is a content-based method of which the basic principle is first to search for text lines or lines in the paper file, and then to estimate the obtained distortion and deformation image according to the searched text lines or lines. However, the content-based method has a disadvantage in that it has many requirements on the contents of the paper file, for example, it requires that there is sufficient information such as text lines, lines or the like in the paper file. Accordingly, if contents in the paper file are mainly pictures and the like while there are less text lines or lines, then the correction effect of the content-based method is poor or even no correction can be achieved.

SUMMARY

Therefore, there are needs for improved image correction method and apparatus which may correct the distortion and deformation image without relying on the information such as text lines, lines or the like contained in the paper file per se, thus there is no more any type of limitation on the contents of the paper file, and it may be adapted to a wide variety of paper files.

According to an embodiment, there is provided an image processing method, including: estimating corners of a contour of an object area in an obtained image; searching for contour lines of the object area between every two points which are offset from the estimated corners within a predetermined degree along a direction away from the object area respectively, and determining intersection points of the contour lines as final corners of the contour of the object area; and determining contour lines between the final corners as a final contour of the object area.

The operation of searching includes: offsetting the estimated corners within the predetermined degree respectively along a principal orientation away from the object area and along a direction away from the object area and being perpendicular to the principal orientation, so as to obtain offset points in the principal orientation and offset points in the direction perpendicular to the principal orientation respectively; tracking contour lines of the object area in the principal orientation between every two offset points in the principal orientation respectively, and tracking contour lines of the object area in the direction perpendicular to the principal orientation between every two offset points in the direction perpendicular to the principal orientation respectively; and determining intersection points between the contour lines in the principal orientation and the contour lines in the direction perpendicular to the principal orientation in the object area.

In the operation of searching, if there are a plurality of intersection points between one contour line in the principal orientation and one contour line in the direction perpendicular to the principal orientation in the object area, then a specified intersection point among the plurality of intersection points is selected as the final corner of the object area.

The operation of estimating the corners of the contour of the object area in the obtained image includes: estimating a center line of the object area in the principal orientation; estimating contour lines of the object area perpendicular to the center line based on the center line; and determining the corners of the object area in accordance with the contour lines of the object area.

The image processing method further includes correcting the object area in the image using a contour-based correction algorithm in accordance with the determined final contour of the object area.

According to another embodiment, there is provided an image processing apparatus, including: a corner estimating unit or device adapted to estimate corners of a contour of an object area in an obtained image; a contour line searching unit or device adapted to search for contour lines of the object area between every two points which are offset from the estimated corners within a predetermined degree along a direction away from the object area respectively, and determining intersection points of the contour lines as final corners of the contour of the object area; and a contour determining unit or device adapted to determine contour lines between the final corners as a final contour of the object area.

The contour line searching unit includes: a corner offsetting unit adapted to offset the estimated corners within the predetermined degree respectively along a principal orientation away from the object area and along a direction away from the object area and being perpendicular to the principal orientation, so as to obtain offset points in the principal orientation and offset points in the direction perpendicular to the principal orientation respectively; a contour line tracking unit adapted to track contour lines of the object area in the principal orientation between every two offset points in the principal orientation respectively, and tracking contour lines of the object area in the direction perpendicular to the principal orientation between every two offset points in the direction perpendicular to the principal orientation respectively; and an intersection point determining unit adapted to determine intersection points between the contour lines in the principal orientation and the contour lines in the direction perpendicular to the principal orientation in the object area.

In the intersection point determining unit, if there are a plurality of intersection points between one contour line in the principal orientation and one contour line in the direction perpendicular to the principal orientation in the object area, then a specified intersection point among the plurality of intersection points is selected as the final corner of the object area.

The estimation unit includes: a unit adapted to estimate a center line of the object area in the principal orientation; a unit adapted to estimate contour lines of the object area perpendicular to the center line based on the center line; and a unit adapted to determine the corners of the object area in accordance with the contour lines of the object area.

The image processing apparatus further includes a unit or device adapted to correct the object area in the image using a contour-based correction algorithm in accordance with the determined final contour of the object area.

By offsetting the estimated corners of an object area and based on the offset points, an embodiment may determine an accurate contour of the object area in the obtained image. Moreover, it is possible to perform correction on the obtained image using a contour-based correction algorithm in accordance with the determined accurate contour of the object area without relying on the information such as text lines, lines or the like contained in the paper file per se, thus there is no more limitation on the contents of the paper file, and it may be adapted to a wide variety of paper files.

BRIEF DESCRIPTION OF THE DRAWINGS

The foregoing and other objects, characteristics, and advantages of the embodiments will be more easily understood with reference to the following description of the embodiments in conjunction with the accompanying drawings in which identical or corresponding technical features or components will be denoted with identical or corresponding reference numerals, wherein.

DETAILED DESCRIPTION

Figure 1A:
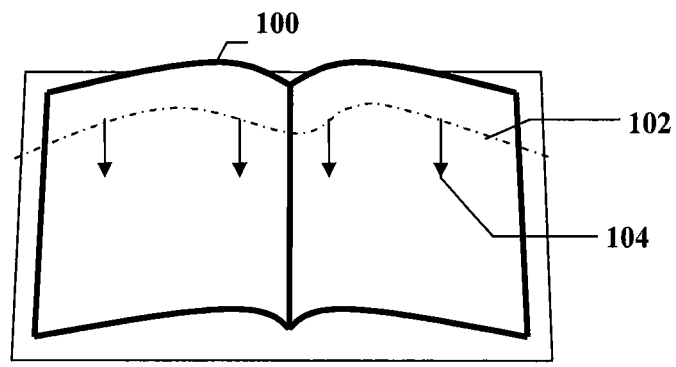
FIG. 1A is a schematic diagram illustrating imaging a paper file using a curved surface imaging apparatus.

The terminology used herein is only for the purpose of describing particular embodiments and is not intended to limit the embodiment. As used herein, the singular forms "a", "an" and "the" may be intended to include the plural forms as well, unless the context clearly indicates otherwise. It is further to be noted that, as used herein, the terms "comprises", "comprising", "includes" and "including" indicate the presence of stated features, integers, steps, operations, units and/or components, but do not preclude the presence or addition of one or more other features, integers, steps, operations, units and/or components, and/or combinations thereof.

Embodiments are described with reference to the drawings in the following. It shall be noted that for the purpose of clarity, representation and description of components and processing irrelevant to the embodiment and known to those skilled in the art are omitted in the drawings and description thereof. Each block of the flow chart and/or block diagram and combinations thereof may be implemented by computer program instructions. These computer program instructions may be supplied to a processor of a general-purpose computer, a dedicated computer or other programmable data processing devices to produce a machine, so that these instructions executed by the computer or other programmable data processing devices produce a device implementing functions/operations specified in the blocks in the flow chart and/or the block diagram.

These computer program instructions may also be stored in a computer-readable media capable of instructing the computer or other programmable data processing devices to operate in a specific way, and thus the instructions stored in the computer-readable media generate a manufacture including instruction means implementing functions/operations specified in the blocks in the flow chart and/or the block diagram.

The computer program instructions may also be loaded into the computer or other programmable data processing devices so that a sequence of operations are executed thereon to generate a computer-implemented procedure, and thus the instructions executed on the computer or other programmable devices may provide a procedure implementing functions/operations specified in the blocks in the flow chart and/or the block diagram.

It should be understood that the flow charts and the block diagrams in the accompanying drawings illustrate system architectures, functions and operations of possible implementations of a system, a method and a computer program product according to various embodiments. In this regard, each block in the flow chart or the block diagram may represent a module, a program segment or a portion of codes which contains one or more executable instructions for implementing specified logical functions. It should also be noted that functions denoted in the block may also occur in an order different from the denoted order in the drawings in some alternative implementations. For example, two blocks denoted successively may actually be performed substantially in parallel or sometimes be performed in a reverse order, depending on the involved functions. It is also to be noted that individual blocks in the block diagram and/or the flow chart and combinations thereof may be implemented by a dedicated hardware-based system executing specified functions or operations, or may be implemented by combinations of dedicated hardware and computer instructions.

Figure 1B:
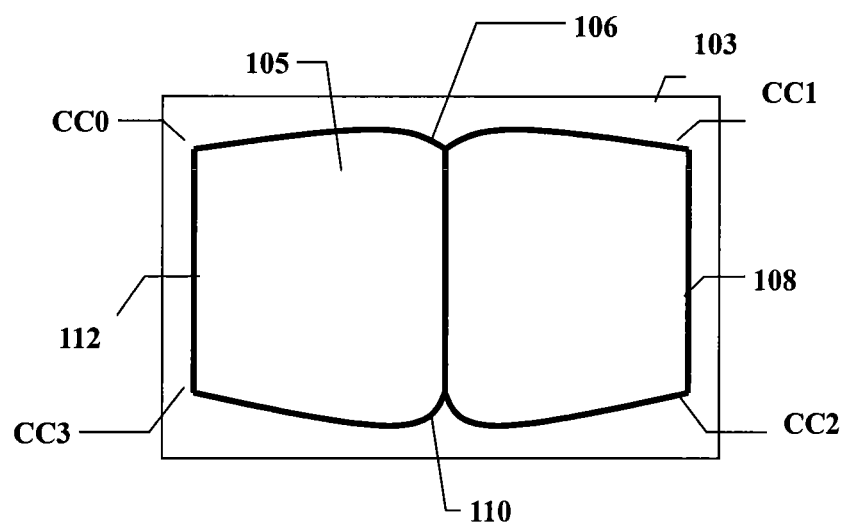
FIG. 1B is a schematic diagram illustrating a distortion and deformation image obtained after imaging the paper file using the curved surface imaging apparatus.

With reference to FIGS. 1A and 1B, they are considered a typical situation in which a curved surface imaging apparatus is used to image a paper file. FIG. 1A is a schematic diagram illustrating imaging a paper file using a curved surface imaging apparatus. FIG. 1B is a schematic diagram illustrating a distortion and deformation image obtained after imaging the paper file using the curved surface imaging apparatus. As illustrated in FIG. 1A, when a paper file 100 is imaged using a curved surface imaging apparatus (not illustrated), e.g., when the paper file 100 is imaged using a overhead line scanner (not illustrated), imaging is sequentially performed in an order from up to down as illustrated with an arrow 104 in FIG. 1A, by use of a line scanning band of the overhead line scanner as illustrated with a dashed line 102 in FIG. 1A. As illustrated in FIG. 1B, the distortion and deformation image 103 obtained after imaging the paper file 100 using the curved surface imaging apparatus (not illustrated) includes an object area 105 corresponding to the paper file 100, and a contour of the object area 105 includes an upper contour line 106 between an upper left corner CC0 and an upper right corner CC1, a lower contour line 110 between a lower left corner CC3 and a lower right corner CC2, a left contour line 112 between the upper left corner CC0 between the lower left corner CC3 and a right contour line 108 between the upper right corner CC1 and the lower right corner CC2, the upper contour line 106 and the lower contour line 110 being curved lines, and the left contour line 112 and the right contour line 108 being straight lines.

As it can be seen, the contour of the object area 105 corresponding to the paper file can substantially be obtained regardless of the specific contents of the paper file, e.g., no matter whether the number of the text lines or lines in the contents of the paper file is more or less. Therefore, the applicant recognized that the obtained image can be corrected using a contour-based correction algorithm based on the obtained contour of the object area 105, so the obtained image can be corrected without relying on information such as text lines, lines or the like contained in the paper file per se, and thus there is no more limitation on the contents of the paper file, and it may be adapted to a wide variety of paper files.

However, since distortion and deformation occur when the paper file 100 is imaged using the curved surface imaging apparatus (not illustrated), there generally exists error between the contour of the object area 105 corresponding to the paper file 100 in the obtained distortion and deformation image 103 and the actual contour of the paper file 100. Therefore, a problem to be solved by the embodiment is how to make the contour of the object area 105 in the obtained image be more approximate to the actual contour of the paper file 100, i.e., how to determine the accurate contour of the object area 105 in the obtained image.

Figure 2:
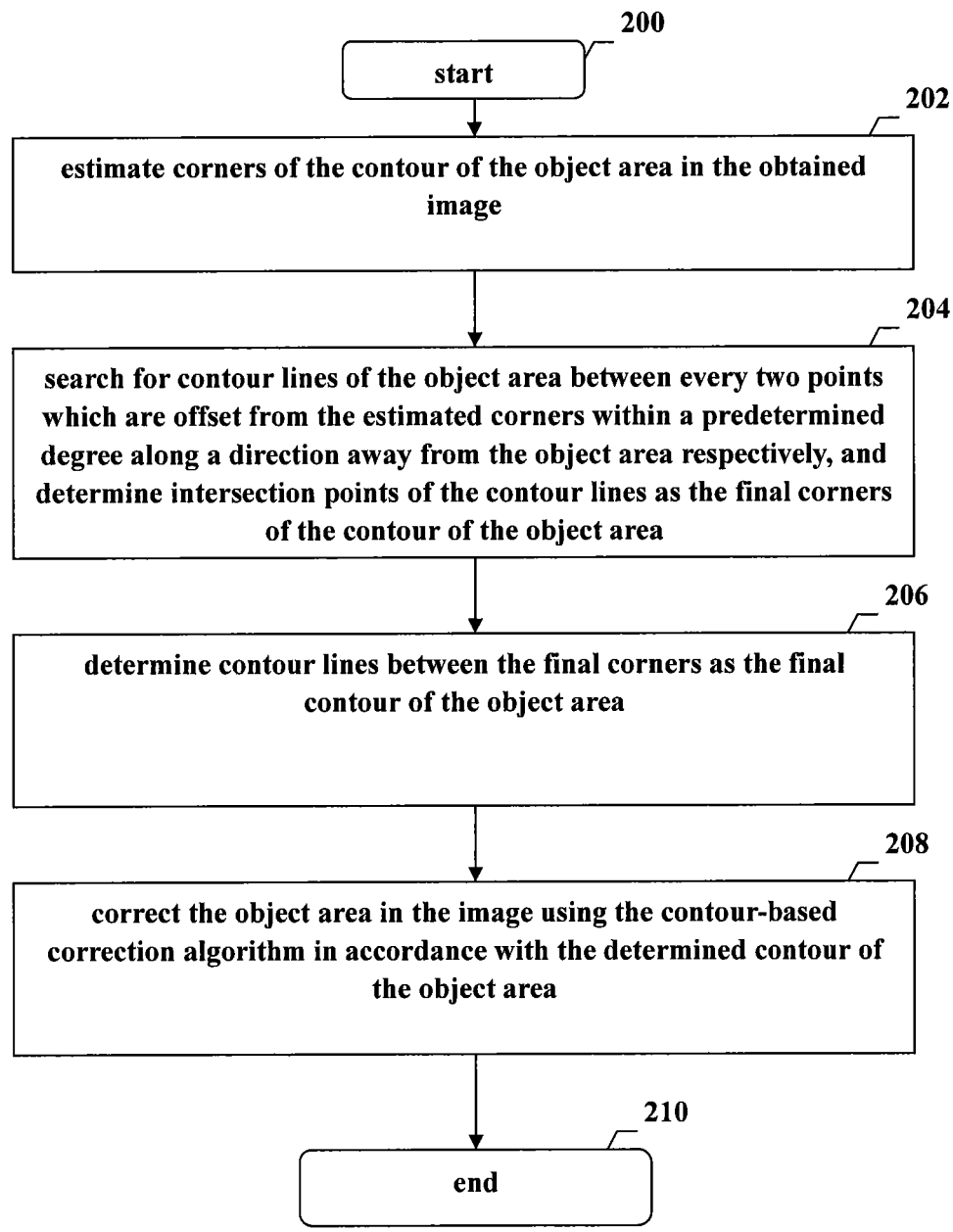
FIG. 2 is a flow chart illustrating an image processing method for determining a contour of an object area in an image according to an embodiment.

The image processing method for determining the contour of the object area in the image according to an embodiment is described with reference to FIG. 2 in the following. FIG. 2 is a flow chart illustrating the method for determining the contour of the object area in the image according to an embodiment.

As illustrated in FIG. 2, this method starts at 200. Next, at 202, corners of the contour of the object area in the obtained image are estimated.

The image of the paper file can be obtained by scanning the paper file using the curved surface imaging apparatus such as a digital camera or a overhead line scanner. With reference to FIG. 1B, the image 103 obtained after imaging the paper file 100 using the curved surface imaging apparatus (not illustrated) includes the object area 105 corresponding to the paper file 100, the contour of the object area 105 including an upper contour line 106, a lower contour line 110, a left contour line 112 and a right contour line 108. Particularly, the intersection point of the upper contour line 106 and the left contour line 112 is the upper left corner CC0, the intersection point of the upper contour line 106 and the right contour line 108 is the upper right corner CC1, the intersection point of the lower contour line 110 and the left contour line 112 is the lower left corner CC3, and the intersection point of the lower contour line 110 and the right contour line 108 is the lower right corner CC2. Generally, after the four corners of the object area are determined, the contour of the object area can be substantially determined according to the four corners as described above. Therefore, in order to determine the contour of the object area, firstly it is necessary to detect four corners of the object area.

Presently, there have been some methods for detecting corners of the object area of which the basic principle is to perform detection in accordance with features of the corners by utilizing local image information around each pixel point. However, the existing methods for detecting the corners of the object area may typically detect a plurality of candidate points, and thus it is necessary to select the final corners from the plurality of candidate points after the detection of the plurality of candidate points. Not only the local image information but also the features of the corners are needed so as to select the final corners from the plurality of candidate points. Therefore, it is difficult to detect accurate corners only in accordance with the local image information.

The present embodiment proposes a novel method for detecting corners of the object area, which is first to estimate coarse positions of the corners of the object area, and then to determine the accurate positions of the corners in accordance with the coarse positions of the corners through the inventive method of the embodiment. Thus, the embodiment gradually determines the accurate positions of the corners in an order from coarse positioning to accurate positioning, thereby improving accuracy and robustness of corner detection. The detailed process of estimating the coarse positions of the corners of the object area will be described later with reference to FIGS. 3-7.

Next, the method proceeds to 204. At 204, contour lines of the object area are searched between every two points which are offset from the estimated corners within a predetermined degree along a direction away from the object area respectively, and intersection points of the contour lines are determined as the final corners of the contour of the object area.

With reference to FIG. 1B, it is assumed that the four coarse corners of the contour of the object area 105 estimated at 202 are the upper left corner CC0, upper right corner CC1, lower right corner CC2 and lower left corner CC3 respectively. For the upper left corner CC0, the upper left corner CC0 may be offset by a certain distance along a direction away from the upper contour line 106 and the left contour line 112 of the object area 105, for example, the upper left corner CC0 may be offset towards its left by a certain distance, towards its upper by a certain distance or towards its upper left by a certain distance. Those skilled in the art may understand that the upper left corner CC0 may also be offset towards other directions by a certain distance as long as those other directions are directions away from the upper contour line 106 and left contour line 112 of the object area 105.

Similarly, for the upper right corner CC1, the upper right corner CC1 may be offset by a certain distance along a direction away from the upper contour line 106 and the right contour line 108 of the object area 105, for example, the upper right corner CC1 may be offset towards its right by a certain distance, towards its upper by a certain distance or towards its upper right by a certain distance. Those skilled in the art may understand that the upper right corner CC1 may also be offset towards other directions by a certain distance as long as those other directions are directions away from the upper contour line 106 and the right contour line 108 of the object area 105.

Similarly, for the lower right corner CC2, the lower right corner CC2 may be offset along a direction away from the lower contour line 110 and the right contour line 108 of the object area 105 by a certain distance, for example, the lower right corner CC2 may be offset towards its right by a certain distance, towards its lower by a certain distance or towards its lower right by a certain distance. Those skilled in the art may understand that the lower right corner CC2 may also be offset towards other directions by a certain distance as long as those other directions are directions away from the lower contour line 110 and right contour line 108 of the object area 105.

Similarly, for the lower left corner CC3, the lower left corner CC3 may be offset along a direction away from the lower contour line 110 and left contour line 112 of the object area 105 by a certain distance, for example, the lower left corner CC3 may be offset towards its left by a certain distance, towards its lower by a certain distance or towards its lower left by a certain distance. Those skilled in the art may understand that the lower left corner CC3 may also be offset towards other directions by a certain distance as long as those other directions are directions away from the lower contour line 106 and left contour line 112 of the object area 105.

Those skilled in the art may understand that the offset certain distance should be able to cover the positions of the accurate corners of the object area, while it should not be offset too far away from the positions of the accurate corners of the object area, for example, the offset certain distance may be determined experimentally, in accordance with experience or in accordance with the statistical analysis of respective detection results.

After the estimated corners are offset within a predetermined degree along the direction away from the object area, the contour line of the object area may be searched between two points which are offset from the estimated corners. For the upper left corner CC0 and upper right corner CC1, for example, after the upper left corner CC0 is offset towards its left by a certain distance to obtain an upper left corner left-offset point CC0L and the upper right corner CC1 is offset towards its right by a certain distance to obtain an upper right corner right-offset point CC1R, the upper contour line of the object area 105 may be searched between the upper left corner left-offset point CC0L and the upper right corner right-offset point CC1R.

Similarly, for the lower left corner CC3 and lower right corner CC2, for example, after the lower left corner CC3 is offset towards its left by a certain distance to obtain a lower left corner left-offset point CC3L and the lower left corner CC2 is offset towards its right by a certain distance to obtain a lower right corner right-offset point CC2R, the lower contour line of the object area 105 may be searched between the lower left corner left-offset point CC3L and the lower right corner right-offset point CC2R.

Similarly, for the upper left corner CC0 and lower left corner CC3, for example, after the upper left corner CC0 is offset towards its upper by a certain distance to obtain an upper left corner upper-offset point CC0U and the lower left corner CC3 is offset towards its lower by a certain distance to obtain a lower left corner lower-offset point CC3D, the left contour line of the object area 105 may be searched between the upper left corner upper-offset point CC0U and the lower left corner lower-offset point CC3D.

Similarly, for the upper right corner CC1 and lower right corner CC2, for example, after the upper right corner CC1 is offset towards its upper by a certain distance to obtain an upper right corner upper-offset point CC1U and the lower right corner CC2 is offset towards its lower by a certain distance to obtain a lower right corner lower-offset point CC2D, the right contour line of the object area 105 may be searched between the upper right corner upper-offset point CC1U and the lower right corner lower-offset point CC2D.

There are many methods for searching for lines between two points in the art, for example, a graph-searching based method or a dynamic programming method may be used, e.g., J. F. Wang and P. J. Howarth, "Automatic Road Network Extraction From Landsat™ Imagery", In processing of ASPRS-ACSM annual convention, Baltimore, USA, Vol. 1, pp. 429-438, 1987.

Those skilled in the art may understand that other points offset from the corners may also be used to search for contour lines of the object area, as long as elongated contour lines of the object area can be obtained from other points offset from the corners.

After the elongated contour lines of the object area 105 are searched out, intersection points between two contour lines may be calculated. There are many methods for calculating intersection points between two lines, and any method for calculating intersection points between two lines may be used to calculate the intersection points between two contour lines, the specific details will not be described any more herein.

If there is only one intersection point between two contour lines, then this intersection point may be regarded as the final corner of the object area. If there are a plurality of intersection points between two contour lines, then a specified intersection point among the plurality of the intersection points may be selected as the final corner of the object area. For example, an average value of the coordinate values of the plurality of intersection points may be calculated, and an intersection point of which the coordinate value is closest to the average value of the coordinate values may be selected as the final corner of the object area.

Then, the method proceeds to 206. At 206, the contour lines between the final corners are determined as the final contour of the object area.

Figure 10:
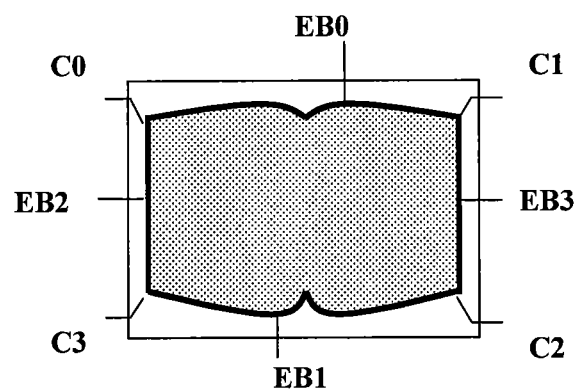
FIG. 10 is a schematic diagram illustrating the determined final contour of the object area.

After the final corners of the object area are determined, the contour lines between every two final corners are intercepted and the final contour is formed by the contour lines intercepted between respective corners. With reference to FIG. 10, FIG. 10 is a schematic diagram illustrating the determined final contour of the object area. As illustrated in FIG. 10, the final corners of the object area are determined as C0, C1, C2 and C3. Then, the contour line between the corners C0 and C1 is intercepted as the upper contour line EB0 of the object area, the contour line between the corners C1 and C2 is intercepted as the right contour line EB3 of the object area, the contour line between the corners C2 and C3 is intercepted as the lower contour line EB1 of the object area, and the contour line between the corners C3 and C1 is intercepted as the left contour line EB2 of the object area. Finally, the upper contour line EB0, the lower contour line EB1, the left contour line EB2 and the right contour line EB3 forms the final contour of the object area.

Next, the method proceeds to 208. At 208, the object area in the image is corrected in accordance with the determined contour of the object area by utilizing a contour-based correction algorithm.

There are many contour-based image correction algorithms in the art. Those skilled in the art may understand that any contour-based image correction algorithm may be used to correct the object area in the image in accordance with the determined final contour of the object area. The specific details will not be described herein.

Finally, the method proceeds to 210. At 210, the method ends.

Figure 3:
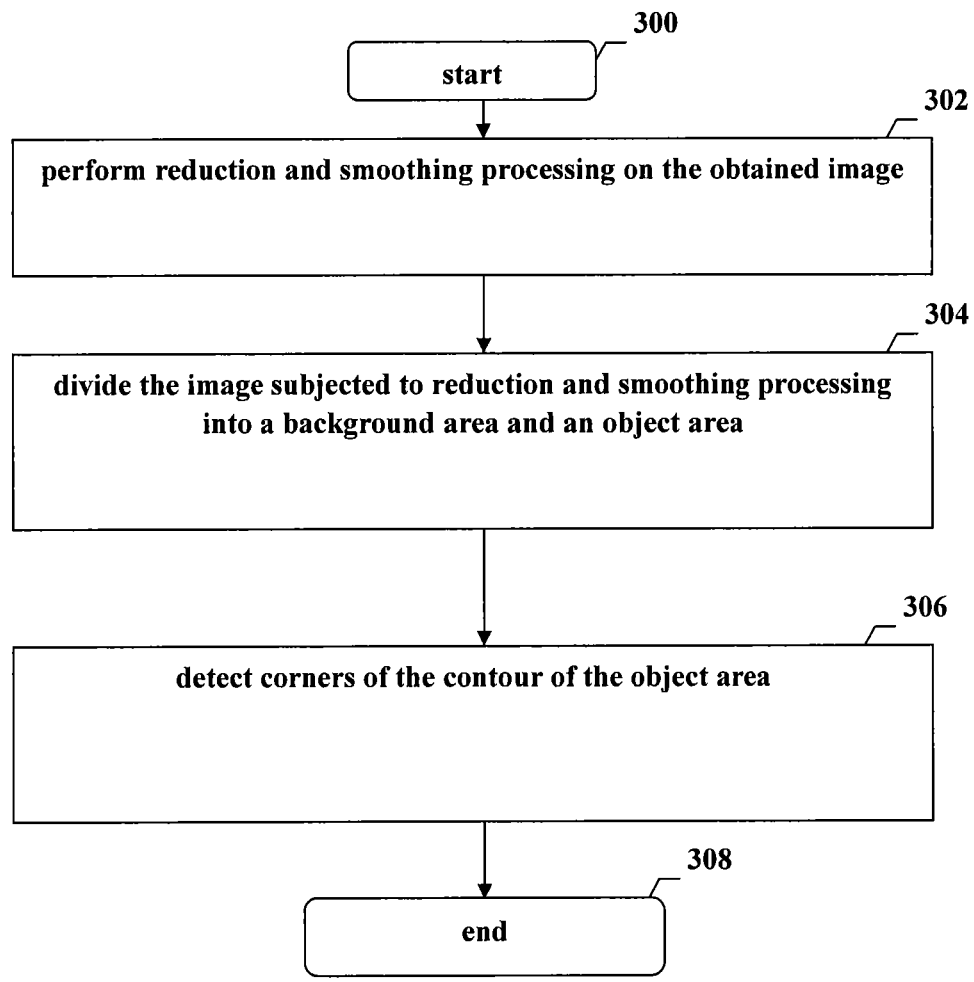
FIG. 3 is a flow chart illustrating a method for estimating corners of the contour of the object area in the obtained image according to an embodiment.
Figure 4A:
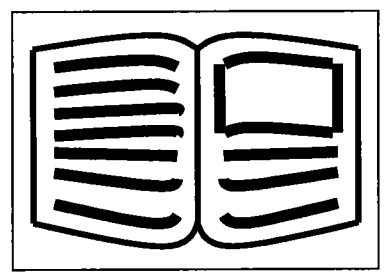
FIG. 4A is a schematic diagram illustrating an image subjected to reduction and smoothing processing.
Figure 4B:
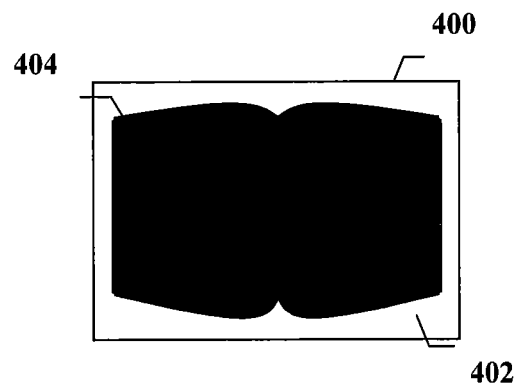
FIG. 4B is a schematic diagram illustrating a binarization image divided into a background area and an object area.

In the following, the detailed process of estimating the corners of the contour of the object area in the obtained image is described with reference to FIGS. 3-4. FIG. 3 is a flow chart illustrating the method for estimating the corners of the contour of the object area in the obtained image according to an embodiment; FIG. 4A is a schematic diagram illustrating the image subjected to reduction and smoothing processing; and FIG. 4B is a schematic diagram illustrating a binarization image divided into a background area and an object area.

As illustrated in FIG. 3, at 302, the reduction and smoothing processing is performed on the obtained image.

The image obtained by scanning the paper file using the curved surface imaging apparatus such as the digital camera or the overhead line scanner, generally has a higher resolution, and contains more pixels, and may possibly contain more image noise. Therefore, it is necessary to perform some preprocessing such as reduction and smoothing processing on the obtained image. Through the reduction processing, the size of the obtained image can be reduced, thereby increasing speed of the subsequent processing. Furthermore, through the smoothing processing, the influence of image noise can be suppressed. With reference to FIG. 4A, FIG. 4A illustrates a schematic diagram of the image subjected to reduction and smoothing processing.

Next, the method proceeds to 304. At 304, the image subjected to reduction and smoothing processing is divided into a background area and an object area.

With reference to FIG. 4B, FIG. 4B is a schematic diagram illustrating a binarization image divided into a background area and an object area. As illustrated in FIG. 4B, an image 400 subjected to reduction and smoothing processing is divided into a background area 402 and an object area 404. Particularly, the background area 402 is an area corresponding to the area except for the paper file, and the object area 404 is an area corresponding to the area of the paper file. As illustrated in FIG. 4B, the background area 402 and the object area 404 are denoted with two different colors respectively, e.g., the background area 402 is denoted with the white color and the object area 404 is denoted with the black color or otherwise, so as to obtain a binarization image. Those skilled in the art may understand that the binarization image may also be denoted with other different colors. The process of dividing the image into the background area and the object area will be described in detail later with reference to FIG. 5.

Next, the method proceeds to 306. At 306, corners of the contour of the object area are detected based on the binarization image.

After the binarization image having the background area and the object area is obtained at 304, the corners of the contour of the object area may be detected based on the binarization image. For example, a center line of the binarization image may be estimated first, then a contour line perpendicular to the center line is estimated based on the center line, and then the corners of the contour of the object area are determined in accordance with intersection points of the contour lines. The process of detecting the corners of the contour of the object area based on the binarization image will be described in detail later with reference to FIGS. 6-7.

Figure 5:
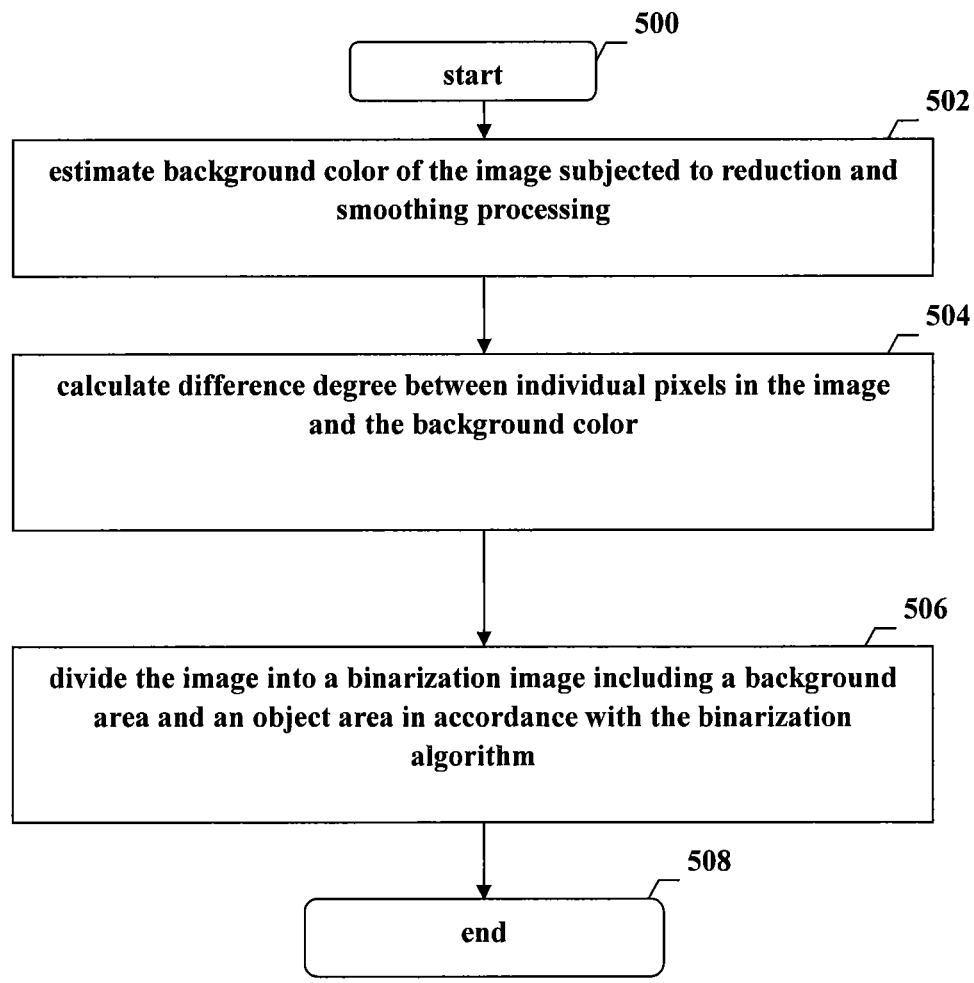
FIG. 5 is a flow chart illustrating a method for dividing an image subjected to reduction and smoothing processing into a binarization image according to an embodiment.

The process of dividing the image into the binarization image having the background area and the object area is described in detail with reference to FIG. 5 in the following. FIG. 5 is a flow chart illustrating the method for dividing the image subjected to reduction and smoothing processing into the binarization image according to an embodiment.

As illustrated in FIG. 5, at 502, the background color of the image subjected to reduction and smoothing processing is estimated.

Generally, in the image obtained by scanning the paper file with the curved surface imaging apparatus, the background has a uniform color and the object area corresponding to the paper file is located at the center of the obtained image. Thus, the color of the background can be estimated from the outer edge area of the image. For example, firstly colors of all the pixels in the outer edge area can be considered in a color histogram statistically, and then the color with a highest frequency of appearance is regarded as the background color. Particularly, the range of the outer edge area can be determined experimentally for example.

Next, the method proceeds to 504. At 504, a distance between the color of individual pixels in the image and the background color is calculated.

After the background color of the image is estimated at 502, a difference degree between the color of individual pixels in the image and the background color is calculated. This difference degree can be measured with the distance between the color of individual pixels in the image and the background color. This distance may be for example an Euler distance. Thus, a distance diagram corresponding to all the pixels in the image can be obtained by calculating the distance between the color of individual pixels in the image and the background color, and in the distance diagram, a gray value of individual pixels corresponds to a distance in a color space. Those skilled in the art may understand that the distance may also be calculated using other distance calculation methods in the art, as long as those methods may be able to calculate the difference degree between the color of individual pixels in the image and the background color.

Next, the method proceeds to 506. At 506, the image is divided into a binarization image including a background area and an object area according to a binarization algorithm.

After the distance between the color of individual pixels in the image and the background color is calculated at 504, the generated distance diagram can be divided by using the binarization algorithm, so that a pixel with a larger distance from the background color is divided into the background area, and a pixel with a smaller distance from the background color is divided into the object area. Then, a value of a color of individual pixels in the background area is converted into one of values of two colors, and a value of a color of individual pixels in the object area is converted into the other of values of the two colors, so that the binarization image including the background area and the object area is obtained. The two colors may be for example black and white. Those skilled in the art may understand that the two colors may also use other colors. The binarization algorithm may be for example an Ostu global binarization algorithm. Those skilled in the art may understand that other binarization algorithms in the art may also be used. With reference to FIG. 4B, for example, the color of individual pixels in the background area 402 is converted into white, and the color of individual pixels in the object area 404 is converted into black.

Figure 6:
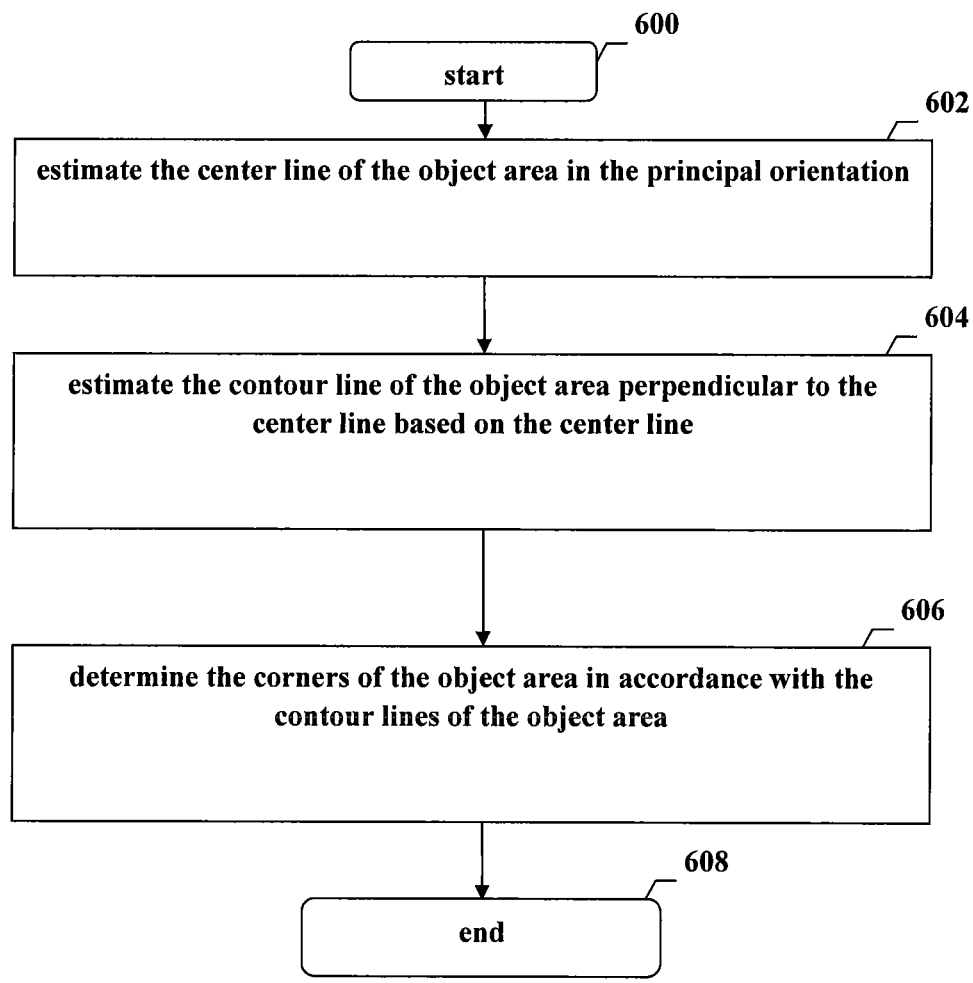
FIG. 6 is a flow chart illustrating a method for detecting corners of a contour of an object area in a binarization image according to an embodiment.
Figure 7A:
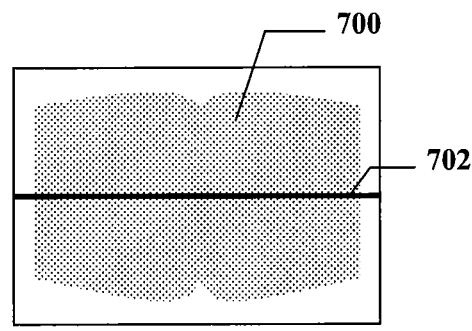
FIG. 7A is a schematic diagram illustrating a center line of the object area in the principal orientation.
Figure 7B:
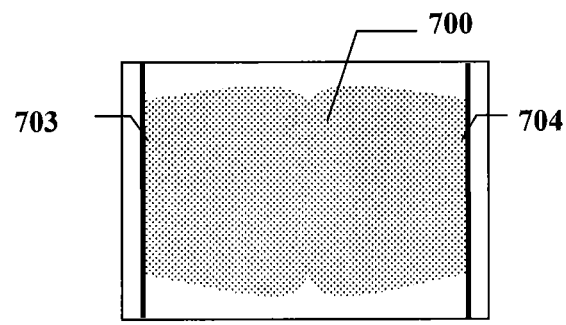
FIG. 7B is a schematic diagram illustrating a contour line of the object area perpendicular to the center line.
Figure 7C:
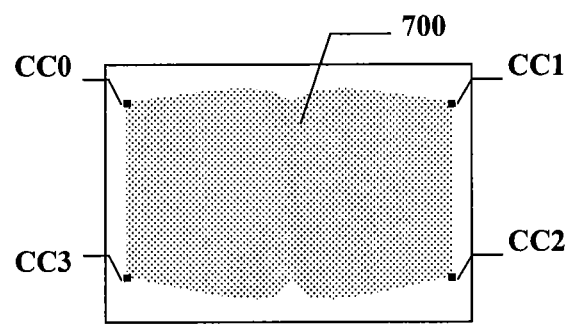
FIG. 7C is a schematic diagram illustrating corners of the object area determined in accordance with the contour lines of the object area.

The method for detecting corners of the contour of the object area in the binarization image is described in detail with reference to FIGS. 6-7 in the following. FIG. 6 is a flow chart illustrating the method for detecting corners of the contour of the object area in the binarization image according to an embodiment. FIG. 7A is a schematic diagram illustrating a center line of the object area in a principal orientation. FIG. 7B is a schematic diagram illustrating a contour line of the object area perpendicular to the center line. FIG. 7C is a schematic diagram illustrating the corners of the object area determined according to the contour lines of the object area.

As illustrated in FIG. 6, at 602, the center line of the object area in the principal orientation is estimated.

With reference to FIG. 7A, in the image as illustrated in FIG. 7A, an object area 700 is positioned horizontally, that is, the left and right contour lines of the object area 700 are straight lines, while the upper and lower contour lines of the object area 700 are curved lines, the horizontal direction being referred as the principal orientation of the object area. If the object area is not positioned horizontally in the image but is inclined to a certain degree with respect to the horizontal direction, then the object area in the image can be preprocessed firstly, for example, the object area in the image can be rotated to a certain degree, so as to transform the object area in the image to the horizontal direction (i.e. the principal orientation).

When the object area 700 is positioned in the principal orientation in the image, a straight line estimation method such as a straight line fit method or a principal component analysis (PCA) method may be used to estimate the center line of the object area in the principal orientation. With reference to FIG. 7A again, it is assumed that the whole object area 700 is a straight line, then the straight line fit method is used to fit all the points in the object area 700, thus obtaining the center line 702 of the object area 700 in the principal orientation, as indicated by the horizontal solid line in FIG. 7A. Those skilled in the art may understand that other straight line estimation methods in the art may also be used to estimate the center line of the object area in the principal orientation.

Next, the method proceeds to 604. At 604, the contour line of the object area perpendicular to the center line is estimated based on the center line.

With reference to FIG. 7B, a left contour line 703 and a right contour line 704 of the object area 700 in the image are substantially perpendicular to the center line 702 in the principal orientation. Therefore, the left contour line 703 and the right contour line 704 of the object area 700 can be estimated by fitting a straight line to the edge pixels of the object area 700 in the image, i.e., pixels in the object area 700 adjacent to the background area. Similarly, the straight line estimation method, such as the straight line fit method or the principal component analysis (PCA) method, may be used to estimate the left contour line 703 and the right contour line 704 of the object area 700. Those skilled in the art may understand that other straight line estimation methods in the art may also be used to estimate the left contour line 703 and the right contour line 704 of the object area 700. Furthermore, a series of intersection points between the center line 702 of the object area 700 in the principal orientation and the object area 700 may be calculated sequentially, the series of intersection points constituting the left contour line 703 and the right contour line 704 of the object area 700 respectively.

Next, the method proceeds to 606. At 606, the corners of the object area are determined based on the contour lines of the object area.

After the left contour line 703 and the right contour line 704 of the object area 700 are obtained at 604, four coarse corners of the object area 700 may be estimated according to the left contour line 703 and the right contour line 704 of the object area 700. With reference to FIG. 7C, taking the upper left corner CC0 as an example, the upper left corner CC0 corresponds to the intersection point between the left contour line 703 and the upper contour line. Generally, the upper contour line is approximately a straight line within a certain distance close to the left contour line. Those skilled in the art may understand that the certain distance may be determined experimentally. Based on the above recognition, the coarse upper left corner CC0 of the object area 700 may be estimated by the method as follows: firstly, calculating the pixel points of the upper contour, the pixel points of the upper contour being pixel points for which current pixel points are in the object area while upper adjoining pixels are in the background area; next, projecting vertically the calculated pixel points of the upper contour onto the left contour line 703 respectively; and finally, counting the number of the pixel points of the upper contour obtained by projecting at individual positions of the left contour line 703, and selecting the point with the highest number on the left contour line 703 as the coarse upper left corner CC0. Likewise, the coarse upper right corner CC1, lower right corner CC2 and lower left corner CC3 of the object area 700 can be obtained respectively.

Figure 8:
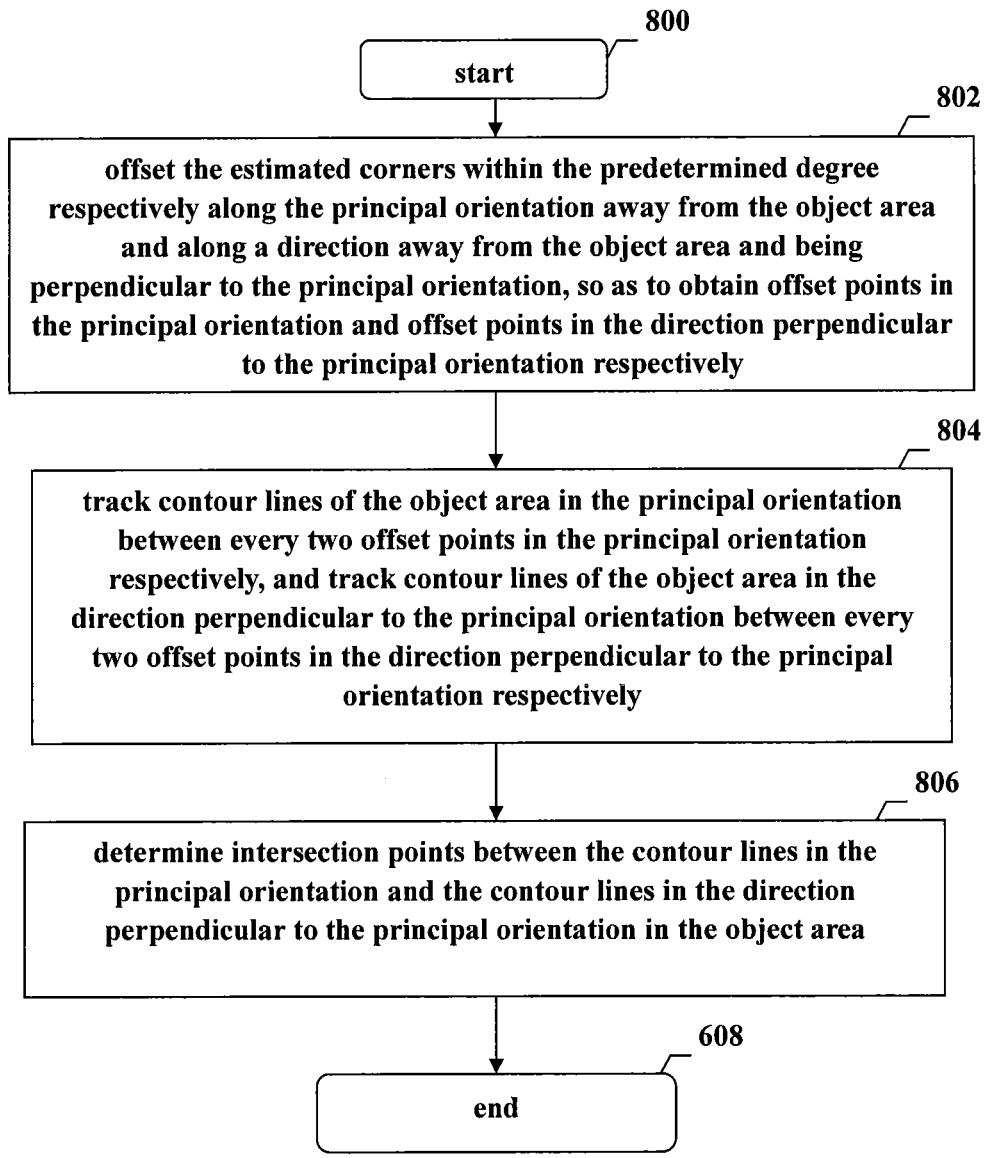
FIG. 8 is a flow chart illustrating a method for searching for the contour line of the object area between two points offset from the estimated corners according to an embodiment.
Figure 9A:
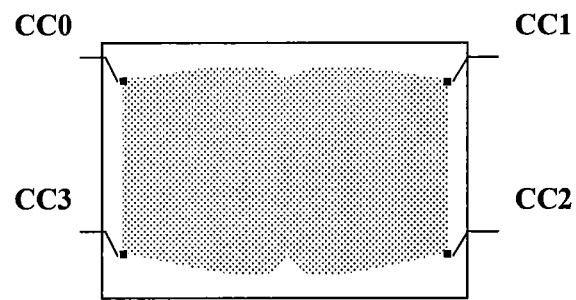
FIG. 9A is a schematic diagram illustrating the estimated corners of the object area.
Figure 9B:
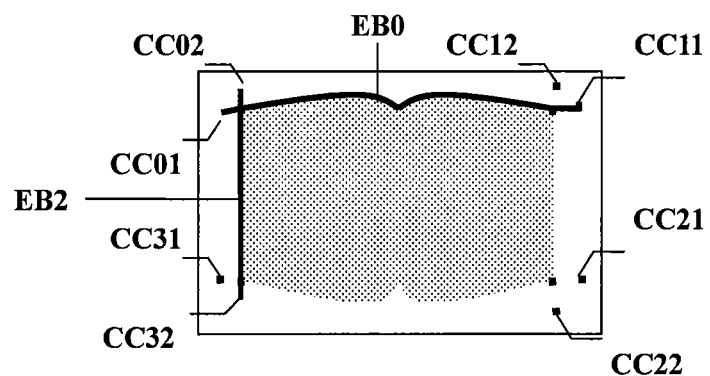
FIG. 9B is a schematic diagram illustrating searching for the contour line of the object area between two points offset from the estimated corners.
Figure 9C:
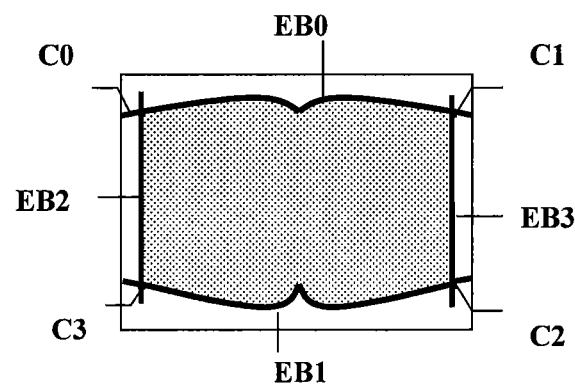
FIG. 9C is a schematic diagram illustrating the searched contour lines of the object area and intersection points thereof.

A method for searching for contour lines of the object area between two points which are offset from the estimated corners is described in detail with reference to FIGS. 8-9 in the following. FIG. 8 is a flow chart illustrating the method for searching for the contour lines of the object area between two points which are offset from the estimated corners according to one embodiment. FIG. 9A is a schematic diagram illustrating the estimated corners of the object area. FIG. 9B is a schematic diagram illustrating searching for the contour lines of the object area between two points which are offset from the estimated corners. FIG. 9C is a schematic diagram illustrating the searched contour lines of the object area and intersection points thereof.

As illustrated in FIG. 8, at 802, the estimated corners are offset within a predetermined degree respectively along a principal orientation away from the object area and along a direction away from the object area and being perpendicular to the principal orientation, so as to obtain offset points in the principal orientation and offset points in the direction perpendicular to the principal orientation respectively.

With reference to FIG. 9A, as illustrated in FIG. 9A, the four estimated coarse corners of the contour of the object area 105 are the upper left corner CC0 (x0, y0), the upper right corner CC1 (x1, y1), the lower right corner CC2 (x2, y2) and the lower left corner CC3 (x3, y3).

With reference to FIG. 9B, for the upper left corner CC0 (x0, y0), the upper left corner CC0 (x0, y0) may be shifted leftwards by a distance t along a principal orientation of the object area so as to obtain the offset point CC01 (x0−t, y0). As described above, the principal orientation of the object area refers to a horizontal direction when the object area is positioned horizontally, i.e., the horizontal direction in which the left and the right contour lines of the object area are straight lines while the upper and the lower contour lines are curved lines. Furthermore, the upper left corner CC0 (x0, y0) may be shifted upwards along a direction perpendicular to the principal orientation by the distance t so as to obtain an offset point CC02 (x0, y0+t).

Similarly, for the upper right corner CC1 (x1, y1), the upper right corner (x1, y1) may be shifted rightwards along the principal orientation of the object area by the distance t so as to obtain an offset point CC11 (x1+t, y1). Furthermore, the upper right corner CC1 (x1, y1) may be shifted upwards along the direction perpendicular to the principal orientation by the distance t so as to obtain an offset point CC12 (x1, y1+t).

Similarly, for the lower right corner CC2 (x2, y2), the lower right corner CC2 (x2, y2) may be shifted rightwards along the principal orientation of the object area by the distance t so as to obtain an offset point CC21 (x2+t, y2). Furthermore, the lower right point CC2 (x2, y2) may be shifted downwards along the direction perpendicular to the principal orientation by the distance t so as to obtain an offset point CC22 (x2, y2−t).

Similarly, for the lower left corner CC3 (x3, y3), the lower left corner CC3 (x3, y3) may be shifted leftwards along the principal orientation of the object area by the distance t so as to obtain an offset point CC21 (x3−t, y3). Furthermore, the lower left corner CC3 (x3, y3) may be shifted downwards along the direction perpendicular to the principal orientation by the distance t so as to obtain an offset point CC32 (x3, y3−t).

Those skilled in the art may understand that, the upper left corner CC0 (x0, y0), the upper right corner CC1 (x1, y1), the lower right corner CC2 (x2, y2) and the lower left corner CC3 (x3, y3) may also be offset towards other directions by a certain distance, as long as those other directions are directions away from the object area. Furthermore, those skilled in the art may understand that the distance t should be able to cover the positions of the accurate corners of the object area, while it should not be offset too far away from the positions of the accurate corners of the object area. For example, the distance t may be determined experimentally, be determined in accordance with experience or be determined in accordance with the statistical analysis of individual detection results.

Next, the method proceeds to 804. At 804, contour lines of the object area in the principal orientation are tracked between every two offset points in the principal orientation respectively, and contour lines of the object area in the direction perpendicular to the principal orientation are tracked between every two offset points in the direction perpendicular to the principal orientation respectively.

With reference to FIG. 9B again, after the upper left corner CC0 (x0, y0) is shifted leftwards along the principal orientation by the distance t to obtain the offset point CC01 (x0−t, y0) and the upper right corner CC1 (x1, y1) is shifted rightwards along the principal orientation by the distance t to obtain the offset point CC11 (x1+t. y1) at 802, the elongated upper contour line EB0 of the object area may be tracked between the point CC01 (x0−t, y0) and the point CC11 (x1+t, y1). Similarly, the elongated lower contour line EB1 of the object area may be tracked between the point CC31 (x3−t, y3) and the point CC21 (x2+t, y2); the elongated left contour line EB2 of the object area may be tracked between the point CC02 (x0, y0+t) and the point CC32 (x3, y3−t); and the elongated contour line EB3 of the object area may be tracked between the point CC12 (x1, y1+t) and the point CC22 (x2, y2−t). The final results are as illustrated in FIG. 9C.

As described above, there are many methods for tracking lines between two points in the art, for example, a graph-searching based method or a dynamic programming method may be used, e.g., J. F. Wang and P. J. Howarth, "Automatic Road Network Extraction From Landsat™ Imagery", In processing of ASPRS-ACSM annual convention, Baltimore, USA, Val, pp. 429-438.

Those skilled in the art may understand that other points offset from the corners may be used to search for the contour lines of the object area, as long as the elongated contour lines of the object area can be obtained from other points offset from the corners.

Next, the method proceeds to 806. At 806, intersection points are determined between the contour lines in the principal orientation and the contour lines in the direction perpendicular to the principal orientation in the object area.

As illustrated in FIG. 9C, an intersection point C0 between the elongated upper contour line EB0 and the elongated left contour line EB2, an intersection point C1 between the elongated upper contour line EB0 and the elongated right contour line EB3, an intersection point C3 between the elongated lower contour line EB1 and the elongated left contour line EB2 and an intersection point C2 between the elongated lower contour line EB1 and the elongated right contour line EB3 are determined respectively (see final contour of FIG. 10).

There are many methods for calculating intersection points between two lines in the art, and any method for calculating the intersection points between two lines can be used to calculate the intersection points between two contour lines, and specific details will not be described any more herein. If there is only one intersection point between two contour lines, then this intersection point can be regarded as the final corner of the object area. If there are a plurality of intersection points between two contour lines, then a specified intersection point among the plurality of intersection points can be selected as the final corner of the object area. For example, an average value of the coordinate values of these plurality of intersection points can be calculated, and the intersection point of which the coordinate value is closest to the average value of the coordinate values is selected as the final corner of the object area.

Figure 11:
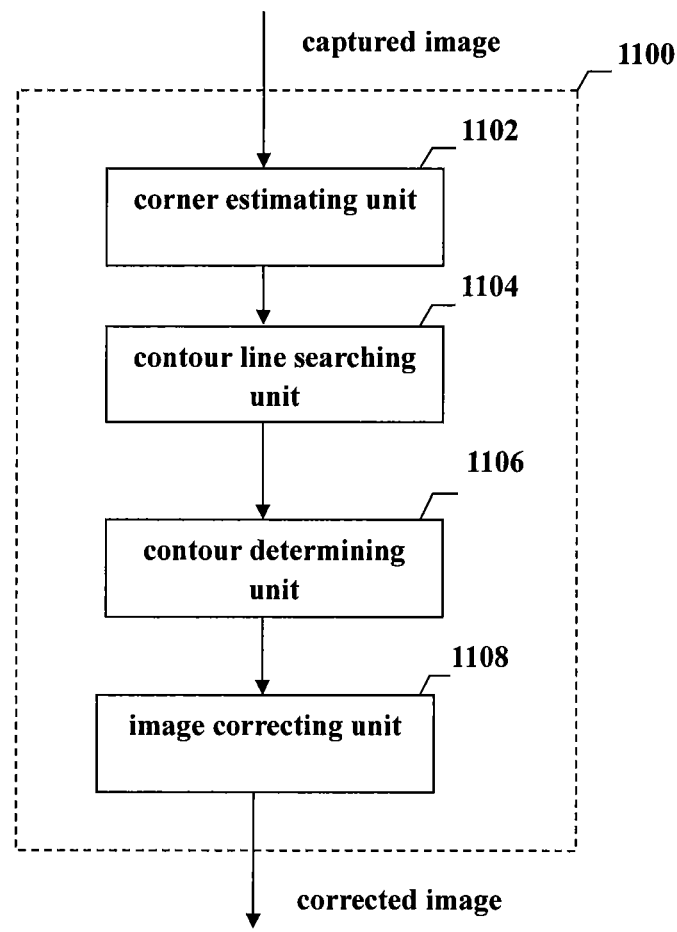
FIG. 11 is a block diagram illustrating an image processing apparatus for determining a contour of an object area in an image according to another embodiment.

In the following, an image processing apparatus for determining a contour of an object area in an image is described in detail with reference to FIG. 11. FIG. 11 is a block diagram illustrating the image processing apparatus for determining the contour of the object area in the image according to another embodiment.

As illustrated in FIG. 11, the image processing apparatus 1100 for determining the contour of the object area in the image, which may be a computer, includes a corner estimating unit 1102, a contour line searching unit 1104, a contour determining unit 1106 and an image correction unit 1108.

Particularly, the corner estimating unit 1102 is used to estimate corners of a contour of an object area in an obtained image; the contour line searching unit 1104 is used to searching for contour lines of the object area between every two points which are offset form the estimated corners within a predetermined degree along a direction away from the object area respectively, and to determine intersection points of the contour lines as final corners of the contour of the object area; the contour determining unit 1106 is used to determine contour lines between the final corners as a final contour of the object area; and the image correction unit 1108 is used to correct the object area in the image using a contour-based correction algorithm in accordance with the determined final contour of the object area.

The image processing apparatus 1100 is an apparatus corresponding to the method as illustrated in FIG. 2, and specific details thereof will not be described any more herein.

Figure 12:
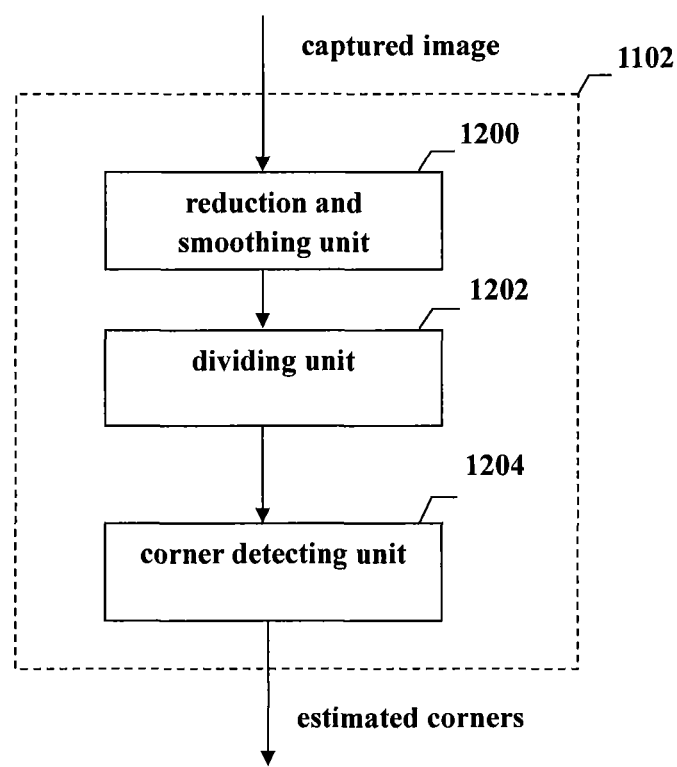
FIG. 12 is a block diagram illustrating a corner estimating unit according to another embodiment.

The corner estimating unit is described in detail with reference to FIG. 12 in the following. FIG. 12 is a block diagram illustrating the corner estimating unit according to an embodiment.

As illustrated in FIG. 12, the corner estimating unit 1102 includes a reduction and smoothing unit 1200, a dividing unit 1202 and a corner detection unit 1204. Particularly, the reduction and smoothing unit 1200 is used to perform reduction and smoothing processing on the obtained image; the dividing unit 1202 is used to divide the image subjected to reduction and smoothing processing into a background area and an object image; and the corner detection unit 1204 is used to detect corners of the contour of the object area based on the binarization image.

The corner estimating unit 1102 is an apparatus corresponding to the method as illustrated in FIG. 3, and specific details thereof will not be described any more herein.

Figure 13:
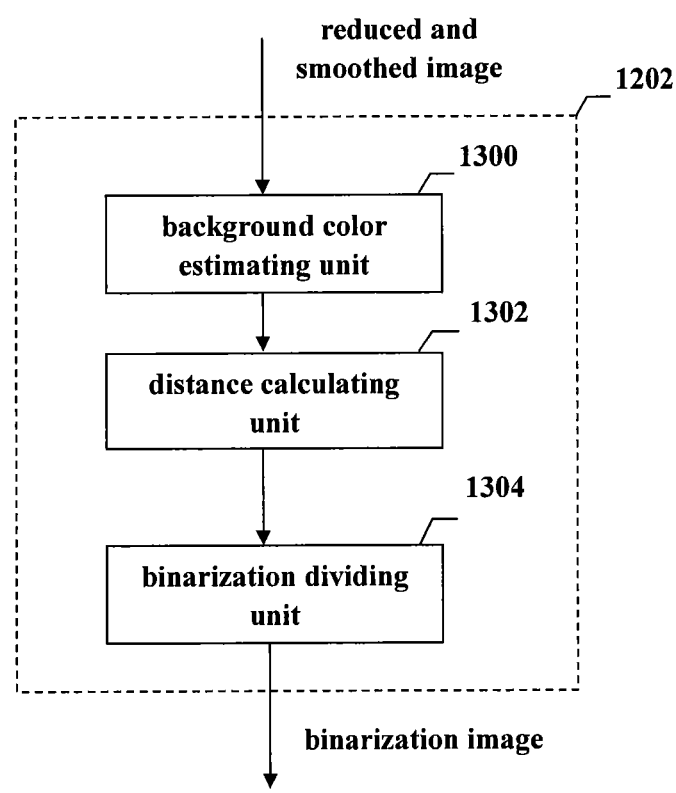
FIG. 13 is a block diagram illustrating a dividing unit according to another embodiment.

The dividing unit is described in detail with reference to FIG. 13 in the following. FIG. 13 is a block diagram illustrating the dividing unit according to an embodiment.

As illustrated in FIG. 13, the dividing unit 1202 includes a background color estimating unit 1300, a distance calculating unit 1302 and a binarization dividing unit 1304. Particularly, the background color estimating unit 1300 is used to estimate the background color of the image subjected to reduction and smoothing processing; the distance calculating unit 1302 is used to calculate the distance between individual pixels in the image and the background color; and the binarization dividing unit 1304 is used to divide the image into a binarization image including the background area and the object area in accordance with a binarization algorithm.

The dividing unit 1202 is an apparatus corresponding to the method as illustrated in FIG. 5, and specific details thereof will not be described any more herein.

Figure 14:
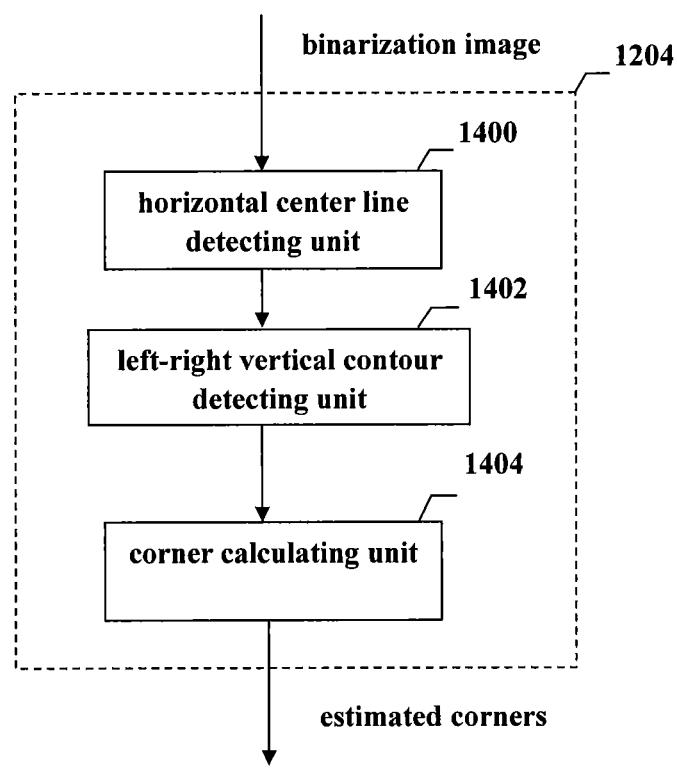
FIG. 14 is a block diagram illustrating a corner detection unit according to another embodiment.

The corner detection unit is described in detail with reference to FIG. 14 in the following. FIG. 14 is a block diagram illustrating the corner detection unit according to an embodiment.

As illustrated in FIG. 14, the corner detection unit 1204 includes a horizontal center line detection unit 1400, a left-right vertical contour detection unit 1402 and a corner calculation unit 1404. Particularly, the horizontal center line detection unit 1400 is used to estimate the center line of the object area in the principal orientation; the left-right vertical contour detection unit 1402 is used to estimate the contour lines of the object area perpendicular to the center line based on the center line; and the corner calculating unit 1404 is used to determine the corners of the object area in accordance with the contour lines of the object area.

The corner detection unit 1204 is an apparatus corresponding to the method as illustrated in FIG. 6, and specific detail thereof will not be described any more herein.

Figure 15:
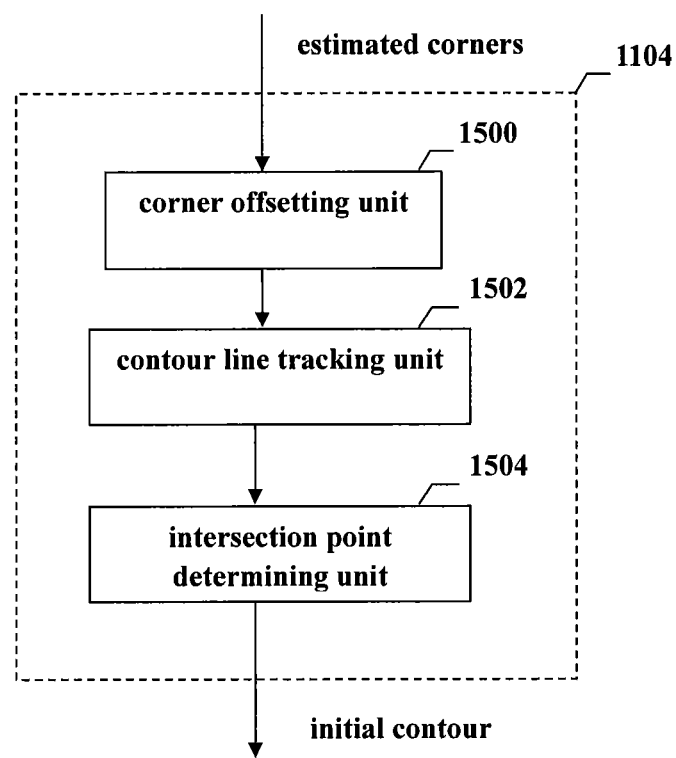
FIG. 15 is a block diagram illustrating a contour line searching unit according to another embodiment.

The contour line searching unit is described in detail with reference to FIG. 15 in the following. FIG. 15 is a block diagram illustrating the contour line searching unit according to an embodiment.

As illustrated in FIG. 15, the contour line searching unit 1104 includes a corner offsetting unit 1500, a contour line tracking unit 1502 and an intersection point determining unit 1504. Particularly, the corner offsetting unit 1500 is used to offset the estimated corners within the predetermined degree respectively along a principal orientation away from the object area and along a direction away from the object area and being perpendicular to the principal orientation, so as to obtain offset points in the principal orientation and offset points in the direction perpendicular to the principal orientation respectively; the contour line tracking unit 1502 is used to track contour lines of the object area in the principal orientation between every two offset points in the principal orientation respectively, and track contour lines of the object area in the direction perpendicular to the principal orientation between every two offset points in the direction perpendicular to the principal orientation respectively; and the intersection point determining unit 1504 is used to determine intersection points between the contour lines in the principal orientation and the contour lines in the direction perpendicular to the principal orientation in the object area.

The contour line searching unit 1104 is an apparatus corresponding to the method as illustrated in FIG. 8, and specific details thereof will not be described any more herein.

Figure 16:
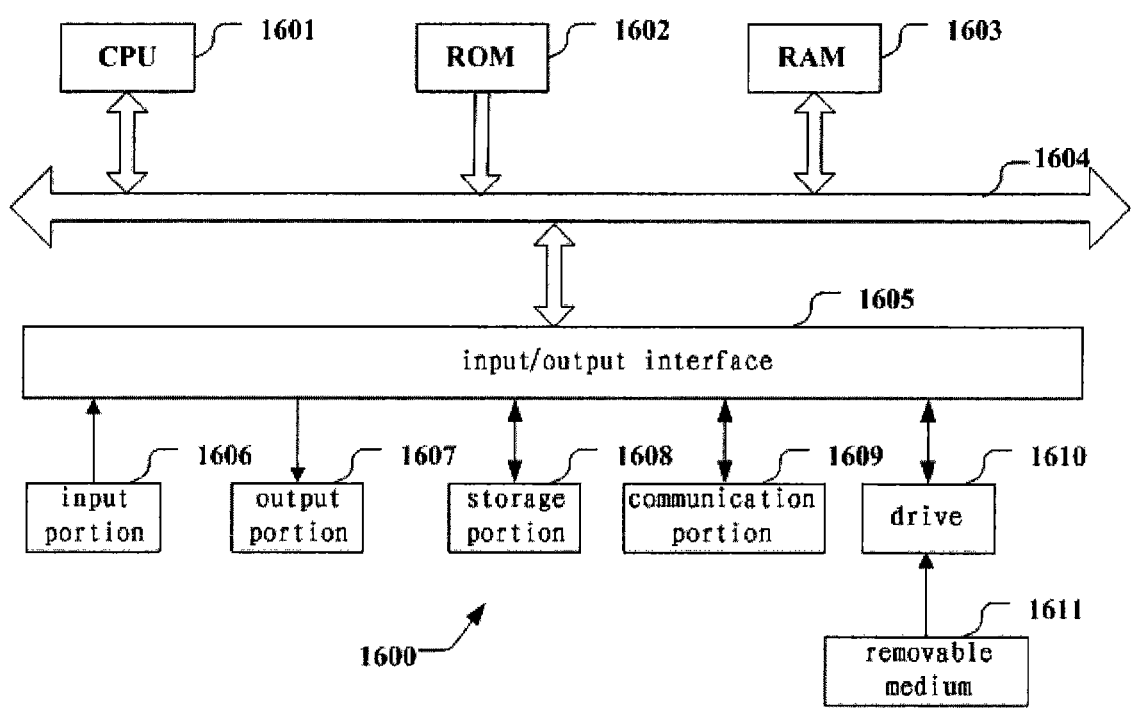
FIG. 16 is a block diagram illustrating an exemplary structure of a computer in which the embodiment is implemented.

FIG. 16 is a block diagram illustrating an exemplary structure of a computer in which the apparatus and method of the invention can be implemented.

In FIG. 16, a central processing unit (CPU) 1601 performs various processing in accordance with a program stored in a Read Only Memory (ROM) 1602 or a program loaded from a storage portion 1608 into a Random Access Memory (RAM) 1603. As necessary, data as required when CPU 1601 performs various processing and the like is stored in the RAM 1603.

CPU 1601, ROM 1602 and RAM 1603 are connected to one another via a bus 1604. An input/output interface 1605 is also connected to the bus 1604.

The following components are connected to the input/output interface 1605: an input portion 1606 including a keyboard, a mouse or the like; an output portion 1607 including a display such as a Cathode Ray Tube (CRT) display, a Liquid Crystal Display (LCD) or the like, a speaker and the like; the storage portion 1608 including a hard disk and the like; and a communication portion 1609 including a network interface card such as a LAN card, a modem or the like. The communication portion 1609 performs communication via a network such as internet.

As necessary, a drive 1610 is also connected to the input/output interface 1605. A removable medium 1611 such as a magnetic disk, an optical disk, a magneto-optical disk, a semiconductor memory or the like is installed on the drive 1610 as necessary, so that the computer program read therefrom is installed into the storage portion 1608 as necessary.

In a case of implementing the above mentioned steps and processing by software, the program constituting the software is installed from the network such as internet or the storage medium such as the removable medium 1611.

Those skilled in the art shall appreciate that such a storage medium will not be limited to the removable medium 1611 as illustrated in FIG. 16 in which the program is stored and which is distributed separately from the method to provide a user with the program. Examples of the removable medium 1611 include a magnetic disk, an optical disk (including Compact Disk-Read Only memory (CD-ROM) and a Digital Versatile Disk (DVD)), a magneto optical disk (including a Mini Disk (MD)) and a semiconductor memory. Alternatively the storage medium can be the ROM 1602, a hard disk included in the storage portion 1608, etc., in which the program is stored and which is distributed together with the method including the same to the user.

Although the embodiments have been described with reference to specific embodiments in the foregoing specification, those skilled in the art should understand that various modifications and variations can be made without departing from the scope of the embodiments as defined by the appended claims.

The invention claimed is:

1. An image processing method, including:
   estimating corners of a contour of an object area in an obtained image;
   searching for contour lines of the object area between every two points which are offset from the estimated corners within a predetermined degree along a direction away from the object area respectively, and determining intersection points of the contour lines as final corners of the contour of the object area; and
   determining contour lines between the final corners as a final contour of the object area,
   wherein the searching includes:
   offsetting the estimated corners within the predetermined degree respectively along a principal orientation away from the object area and along a direction away from the object area and being perpendicular to the principal orientation, so as to obtain offset points in the principal orientation and offset points in the direction perpendicular to the principal orientation respectively;
   tracking contour lines of the object area in the principal orientation between every two offset points in the principal orientation respectively, and tracking contour lines of the object area in the direction perpendicular to the principal orientation between every two offset points in the direction perpendicular to the principal orientation respectively; and
   determining intersection points between the contour lines in the principal orientation and the contour lines in the direction perpendicular to the principal orientation in the object area.

2. The method according to claim 1, wherein if there are a plurality of intersection points between one contour line in the principal orientation and one contour line in the direction perpendicular to the principal orientation in the object area, then a specified intersection point among the plurality of intersection points is selected as the final corner of the object area.

3. The method according to claim 1, wherein the step of estimating the corners of the contour of the object area in the obtained image includes:
   estimating a center line of the object area in the principal orientation;
   estimating the contour lines of the object area perpendicular to the center line based on the center line; and
   determining the corners of the object area in accordance with the contour lines of the object area.

4. The method according to claim 1, further including:
   correcting the object area in the image using a contour-based correction algorithm in accordance with the determined final contour of the object area.

5. The method according to claim 1, further including:
   correcting the object area in the image using a contour-based correction algorithm in accordance with the determined final contour of the object area.

6. The method according to claim 2, further including:
   correcting the object area in the image using a contour-based correction algorithm in accordance with the determined final contour of the object area.

7. The method according to claim 3, further including:
   correcting the object area in the image using a contour-based correction algorithm in accordance with the determined final contour of the object area.

8. An image processing apparatus, including a processor, wherein the processor includes:
   a corner estimating unit adapted to estimate corners of a contour of an object area in an obtained image;
   a contour line searching unit adapted to search for contour lines of the object area between every two points which are offset from the estimated corners within a predetermined degree along a direction away from the object area respectively, and determining intersection points of the contour lines as final corners of the contour of the object area; and
   a contour determining unit adapted to determine contour lines between the final corners as a final contour of the object area,
   wherein the contour line searching unit includes:
   a corner offsetting unit adapted to offset the estimated corners within the predetermined degree respectively along a principal orientation away from the object area and along a direction away from the object area and being perpendicular to the principal orientation, so as to obtain offset points in the principal orientation and offset points in the direction perpendicular to the principal orientation respectively;
   a contour line tracking unit adapted to track contour lines of the object area in the principal orientation between every two offset points in the principal orientation respectively, and tracking contour lines of the object area in the direction perpendicular to the principal orientation between every two offset points in the direction perpendicular to the principal orientation respectively; and
   an intersection point determining unit adapted to determine intersection points between the contour lines in the principal orientation and the contour lines in the direction perpendicular to the principal orientation in the object area.

9. The apparatus according to claim 8, wherein if there are a plurality of intersection points between one contour line in the principal orientation and one contour line in the direction perpendicular to the principal orientation in the object area, then a specified intersection point among the plurality of intersection points is selected as the final corner of the object area.

10. The apparatus according to claim 8, wherein the corner estimating unit includes:
    a unit adapted to estimate a center line of the object area in the principal orientation;
    a unit adapted to estimate the contour lines of the object area perpendicular to the center line based on the center line; and
    a unit adapted to determine the corners of the object area in accordance with the contour lines of the object area.

11. The apparatus according to claim 8, further including:
    a unit adapted to correct the object area in the image using a contour-based correction algorithm in accordance with the determined final contour of the object area.

12. The apparatus according to claim 8, further including:
a unit adapted to correct the object area in the image using a contour-based correction algorithm in accordance with the determined final contour of the object area.

13. The apparatus according to claim 9, further including:
   a unit adapted to correct the object area in the image using a contour-based correction algorithm in accordance with the determined final contour of the object area.

14. The apparatus according to claim 10, further including:
a unit adapted to correct the object area in the image using a contour-based correction algorithm in accordance with the determined final contour of the object area.

\* \* \* \* \*